United States Patent
Ansley et al.

(10) Patent No.: US 11,943,683 B2
(45) Date of Patent: Mar. 26, 2024

(54) AUTOMATED FREQUENCY COORDINATION AND DEVICE LOCATION AWARENESS

(71) Applicant: ARRIS Enterprises LLC, Suwanee, GA (US)

(72) Inventors: Carol J. Ansley, Johns Creek, GA (US); Charles Cheevers, Alpharetta, GA (US); Ian Wheelock, Cork (IE); Thomas Gravely, Herndon, VA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/851,476

(22) Filed: Jun. 28, 2022

(65) Prior Publication Data

US 2022/0329979 A1    Oct. 13, 2022

Related U.S. Application Data

(63) Continuation of application No. 16/876,750, filed on May 18, 2020.

(60) Provisional application No. 62/848,925, filed on May 16, 2019.

(51) Int. Cl.
*H04W 4/029* (2018.01)
*H04W 16/14* (2009.01)

(52) U.S. Cl.
CPC ........ *H04W 4/029* (2018.02); *H04W 16/14* (2013.01)

(58) Field of Classification Search
CPC . H04W 4/029; H04W 16/14; H04W 72/1215; H04W 64/003; H04W 72/08; H04W 76/00; H04W 76/20; H04W 88/02; H04W 88/06

USPC ....... 455/422, 575.9, 552.1, 41.1, 41.2, 307, 455/456.1, 509, 422.1, 445; 370/329, 370/254, 216, 318, 338, 311, 235

See application file for complete search history.

(56) References Cited

U.S. PATENT DOCUMENTS

| | | | |
|---|---|---|---|
| 5,548,809 A * | 8/1996 | Lemson | H04W 16/14 455/454 |
| 6,728,522 B1 * | 4/2004 | Marrah | H03J 1/0075 455/150.1 |

(Continued)

FOREIGN PATENT DOCUMENTS

| WO | 2019/050942 | 3/2019 |
|---|---|---|

OTHER PUBLICATIONS

International Search Report dated Jul. 22, 2020 in International (PCT) Application No. PCT/US2020/033379.

(Continued)

*Primary Examiner* — Joseph Arevalo
(74) *Attorney, Agent, or Firm* — Wenderoth, Lind & Ponack, L.L.P.

(57) ABSTRACT

Methods, systems, and computer readable media described herein can be operable to facilitate location determination, communications with an AFC system, configuring operational parameters in response to an identification of active 6 GHz paths, and timing distribution and low-latency services. Methods, systems, and computer readable media are described herein for implementing and improving use of automated frequency coordination (AFC), operational deployment of the 6 GHz band for unlicensed devices, and use of the 6 GHz band for low-latency services, timing distribution, and QoS.

20 Claims, 12 Drawing Sheets

(56) References Cited

U.S. PATENT DOCUMENTS

| | | | | |
|---|---|---|---|---|
| 8,862,152 | B1* | 10/2014 | Buchholz | G08B 21/02 |
| | | | | 455/456.1 |
| 8,983,493 | B2 | 3/2015 | Brachet | |
| 9,008,684 | B2 | 4/2015 | Tipton | |
| 2002/0164997 | A1* | 11/2002 | Parry | H04L 67/52 |
| | | | | 455/445 |
| 2004/0206408 | A1 | 10/2004 | Peters | |
| 2006/0061469 | A1* | 3/2006 | Jaeger | G01S 5/0294 |
| | | | | 340/539.13 |
| 2008/0233946 | A1* | 9/2008 | Henry | H04W 16/14 |
| | | | | 455/422.1 |
| 2012/0058778 | A1 | 3/2012 | Waters | |
| 2012/0231826 | A1 | 9/2012 | Koorapaty et al. | |
| 2013/0023215 | A1* | 1/2013 | Wang | H04W 16/14 |
| | | | | 455/41.2 |
| 2013/0317944 | A1 | 11/2013 | Huang | |
| 2014/0155084 | A1 | 6/2014 | Pon | |
| 2014/0221005 | A1 | 8/2014 | Marshall | |
| 2015/0036509 | A1* | 2/2015 | Lopes | H04L 5/0062 |
| | | | | 370/252 |
| 2015/0230105 | A1* | 8/2015 | Negus | H04W 72/20 |
| | | | | 370/329 |
| 2016/0056929 | A1 | 2/2016 | Kwon | |
| 2016/0225264 | A1* | 8/2016 | Taveira | H04W 48/04 |
| 2019/0075549 | A1 | 3/2019 | Yucek et al. | |
| 2019/0120969 | A1 | 4/2019 | Hamzeh | |
| 2019/0280763 | A1* | 9/2019 | Smyth | H04B 7/18517 |
| 2019/0327124 | A1 | 10/2019 | Lai | |
| 2020/0300972 | A1 | 9/2020 | Wang | |

OTHER PUBLICATIONS

International Preliminary Report on Patentability dated Nov. 16, 2021 in International (PCT) Application No. PCT/US2020/033379.
Office Action dated Sep. 1, 2023 in corresponding Canadian Application No. 3,137,833.

* cited by examiner

AUTOMATED FREQUENCY COORDINATION AND DEVICE LOCATION AWARENESS

CROSS REFERENCE TO RELATED APPLICATION

This application is a non-provisional application claiming the benefit of U.S. Provisional Application Ser. No. 62/848,925, entitled "6 GHz Wireless," which was filed on May 16, 2019, and a continuation of application Ser. No. 16/876,750, entitled "6 GHz Wireless," which was filed May 18, 2020, and is incorporated herein by reference in its entirety.

TECHNICAL FIELD

This disclosure relates to automated frequency coordination and device location awareness.

BACKGROUND

Usage of unlicensed spectrum continues to grow with the growth in wireless devices and services that are available to subscribers. The rise in bandwidth usage, coupled with a lack of new mid-band unlicensed spectrum allocations has created serious congestion issues in available mid-band unlicensed spectrum.

The 6 GHz band is in a prime area of the midband spectrum. Various regulations have been implemented to protect established microwave systems from interference. Regulations also enable microwave systems to be freely deployed and operated.

Regulations have been approved to allow use of the 6 GHz band by unlicensed devices. The regulations include limitations would require that unlicensed devices operate only in locations and frequencies that will not create interference for other users of the 6 GHz band. The FCC has considered varying treatment for four sub-bands of the 6 GHz band, wherein the sub-bands include:

U-NII 5: 5925-6425 MHz
U-NII 6: 6425-6525 MHz
U-NII 7: 6525-6825 MHz
U-NII 8: 6875-7125 MHz

Different regulations have been proposed for each of the sub-bands. Example use limitations that may be imposed for the sub-bands include:

For the U-NII 5 and U-NII 7 sub-bands:
  i. Unlicensed devices may only be allowed to transmit under the control of an automated frequency coordination (AFC) system.
  ii. The AFC system may identify frequencies on which unlicensed devices may operate without causing harmful interference to fixed point-to-point microwave receivers.
  iii. Unlicensed devices may operate at a standard power (e.g., 4 W, 1 W, etc.).

For all of the 6 GHz sub-bands:
  i. Unlicensed devices may be restricted to indoor use and may be required to operate at lower power (e.g., 1 W, 250 milliwatts, 24 milliwatts, etc.), without requiring the coordination of an AFC system.
  ii. The frequencies in the U-NII 6 and U-NII8 sub bands are used for mobile services, such as the Broadcast Auxiliary Service and Cable Television Relay Service, as well as fixed satellite services. The itinerant nature of the mobile services makes the use of an AFC system impractical.
  iii. The combination of lower power and indoor operations may protect other registered services already operating on these frequencies from harmful interference.

BRIEF DESCRIPTION OF THE DRAWINGS

Like reference numbers and designations in the various drawings indicate like elements.

DETAILED DESCRIPTION

Methods, systems, and computer readable media described herein can be operable to facilitate location determination, communications with an AFC system, configuring operational parameters in response to an identification of active 6 GHz paths, and timing distribution and low-latency services. Methods, systems, and computer readable media are described herein for implementing and improving use of automated frequency coordination (AFC), operational deployment of the 6 GHz band for unlicensed devices, and use of the 6 GHz band for low-latency services, timing distribution, and QoS.

Automated Frequency Coordination (AFC)

Figure 1:
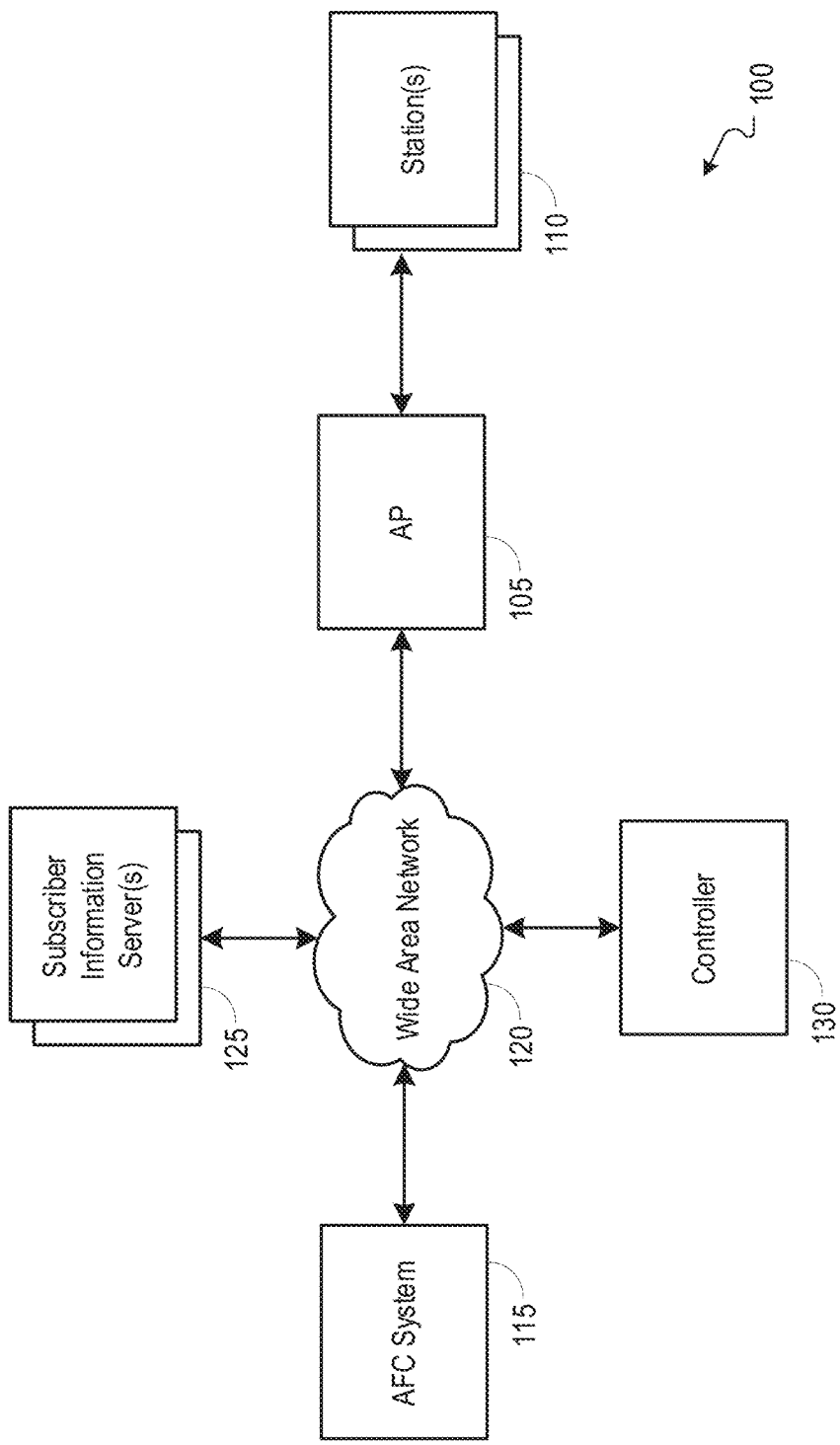
FIG. 1 shows an example network operable to facilitate device management based upon a determination of proximity to one or more exclusion zones.

FIG. 1 shows an example network 100 operable to facilitate device management based upon a determination of proximity to one or more exclusion zones.

In embodiments, operation of a device (e.g., an access device such as an access point (AP) 105 and/or one or more stations 110 associated with the AP 105) may be dependent upon communications with an AFC system 115. An AP 105 as described herein may include a RLAN (radio local area network) device, a WLAN (wireless local area network), and any other device configured to facilitate wireless communications with other devices. The AFC system 115 may include a database that contains pre-calculated exclusion zone data for one or more microwave paths. It should be understood that spectrum availability may be calculated upon request. The exclusion zone data may be updated at the database periodically (e.g., hourly, daily, etc.) or in response to an addition or deletion of data associated with a microwave path. Communications between a device and the AFC system 115 may be over wired or wireless links not in the 6 GHz band. The AFC system 115 and its database may be connected to a packet-based wide area network (e.g., wide area network (WAN) 120), including but not limited to the Internet. Each of one or more devices (e.g., AP 105) may register with the database. Initial registration and query may be made outside of the 6 GHz bands. In embodiments, each device (e.g., APs 105) may also register devices that are associated with the device (e.g., STAs (stations) 110, clients, etc.). Each device may query the database with location information (e.g., location information associated with a current location of the device), an identification of the device type, identifying information (e.g., unique identifiers), and/or other information associated with the device. Based upon the query received from each respective one device, the database may determine a proximity of the respective device to one or more exclusion zones.

A device (e.g., AP 105) may automatically determine a geographic location at which the device is currently positioned and/or a location at which the device has been installed. For example, GPS, cellular triangulation, or other systems may be utilized to determine a location of the device. A device may alternatively or additionally be proved using location information through a local user interface or remotely through a provisioning or status interface.

In embodiments, the device may include an internal GPS through which the device may determine its current location. The internal GPS may be utilized by a device that is installed at an outdoor location.

In embodiments, the device may communicate with a detached GPS receiver to determine a current location of the device. For example, the GPS receiver may be installed at an outdoor location while the device may be installed at an indoor location. With the location of the GPS receiver being known, the device may determine its own location using one or more Wi-Fi location determination features to map back from the GPS receiver's location. For example, the device may measure a signal strength and/or direction component associated with one or more wireless signals received at the device, and the measurements may be used to identify a location of the device relative to the GPS receiver.

A STA (station) 110 (e.g., wireless extender, etc.) may determine its location by wirelessly communicating with the device (e.g., AP 105). The STA 110 may determine its location relative to the device. For example, the wireless extender may use one or more Wi-Fi location determination features (e.g., signal strength, direction component associated with one or more received signals, etc.) to map its location relative to the device.

It should be understood that cellular triangulation may be used in place of GPS. Other satellite-based location determination services may also be used in the place of GPS, such as Galileo.

The device (e.g., AP 105) may be manually configured with device location information. In embodiments, a technician (e.g., licensed technician or installer) may configure the device with location information once the device has been installed. For example, the device may be configured with a trusted certificate, blockchain, or other information to be used to authenticate a location of the device that is manually provided.

The device (e.g., AP 105) may be provided location information through a provisioning server or configuration server. In embodiments, a provisioning server may have information about the address of a customer deploying the device and may provide that address information to the device.

In embodiments, the device (e.g., AP 105), or an upstream device (e.g., controller of the AFC system 115), may be configured to detect a movement of the device. The device, or upstream device, may be configured to determine a current location of the device in response to a triggering event. Triggering events may include, but are not limited to, the following: reboot of the device, detection of a loss or addition of a STA from which communications are received by the device, and others. In embodiments, a co-located device (e.g., AP (access point)) may determine that another co-located device has moved based upon a change in location that is indicated by one or more Wi-Fi location determination features.

An outdoor GPS-AP may utilize an interlock to prevent it from being moved and continuing to operate. Such an interlock could cause the AP to reinitialize its GPS position and contact the AFC when it believes it has been moved. If the device had used a technician provided location, a physical interlock may be utilized. For example, if the AP lost power and had power restored, it could attempt to determine if it had been moved by querying other location-specific or at least location-indicating attributes. For example, if it was integrated with a cable modem, the cable modem could inform the AP whether or not it had been moved to a new HFC (hybrid fiber-coaxial) feed (new power levels, new CMTS (cable modem termination system) communication information, different cable group, etc.). Other location indications could be: DHCP server changes, DHCP Gateway changes, new clients/loss of old clients, new overlapping Wi-Fi Basic Service Sets (OBSSs). In embodiments, a 6 GHz AP may be collocated with a 5 GHz AP and/or a 2.4 GHz AP. If those collocated APs report new neighboring APs, one or more new clients, or the presence of other new wireless devices, the 6 GHz AP may refuse to transmit until its location is updated by a trusted source.

In embodiments, the AFC system 115 may utilize location information from multiple sources to verify or otherwise improve the level of confidence in a determined location of a device (e.g., AP 105). For example, the AFC system 115 may correlate location information of a device with GPS data with a physical address associated with a customer (e.g., an address recovered from billing data or subscriber information held at a subscriber information server 125 such as a service provider server or other server storing subscriber or account information).

Location Determination Through RF Scans in 6 GHz Band

A device needing to perform location determination, typically an AP 105, initializes and comes up to scan available frequency bands. An AP may have access to 2.4 GHz, 5 GHz, and 6 GHz radios. The AP can scan 2.4, 5 and 6 GHz bands for Wi-Fi signals. The SSIDs obtainable from received Wi-Fi transmissions can contribute to an estimate of the AP's location. The signals of other 6 GHz APs may be detected from a 6 GHz scan or from analysis of information about 6 GHz SSIDs included in the 5 GHz or 2.4 GHz signals. For example, one or more signals received by an AP 105 through a 2.4 GHz or 5 GHz radio may indicate a presence or offering of a 6 GHz SSID by one or more other APs. A goal of 802.11 standards for the 6 GHz band is to restrict the amount of beaconing and similar activities to decrease the percentage of airtime given over to background or maintenance activities. An AP with 6 GHz capability may announce that capability in its 2.4 and/or 5 GHz transmissions.

The AP 105 can also scan 6 GHz bands for the presence of non-Wi-Fi signals. The signals of fixed wireless or other non-Wi-Fi communications can be detected and, potentially, their directions recorded. Utilizing energy detection, an AP need not be able to demodulate or decode a fixed wireless or other non-Wi-Fi communications signal to detect its presence. In embodiments, further processing, beyond energy detection, is performed on the received signal spectrum. The characteristics of at least well-known signals such as fixed microwave signals can be applied to the received signal spectrum and energy signatures of potential interest marked for more processing. For instance, fixed microwave signals are typically 30 MHz wide and occur in pairs. These signals are also required to be registered with the FCC. In embodiments, a signal spectrum detected by an AP may be processed locally or sent to a controller 130 or cloud server for further processing.

If the AP 105 is processing the spectrum locally, it may detect a certain combination of fixed microwave signals. With that information, the AP can consult a database containing 6 GHz registered signal sites. Fixed wireless assigned frequencies may be recorded in a database that also includes location information. When combined with the Wi-Fi signal information, the location of the AP may be ascertained with greater certainty or less uncertainty. An AP may develop a location estimate based on these sources of information, even if a GPS or similar location determination equipment is not available. If the AP sends a collected signal spectrum to a controller 130 or cloud server, those entities similarly may consult databases of known 6 GHz entities to develop a location estimate. Those entities may also consult databases of known 2.4 GHz and 5 GHz signal sources. That estimate may be returned to the AP for it to use in communication with an AFC system. Alternatively, the controller 130 or cloud server may forward the location estimate with information identifying the AP to an AFC. If the AP recognizes Wi-Fi signals within the 6 GHz scan, that information may also be used to aid with location determination.

As mentioned earlier, additional sources of location information may include client devices such as smart phones that have associated with the AP's 2.4 or 5 GHz radios as well as GPS receivers or the like. Many smart phones have built-in GPS receivers and can provide an estimate of their current location by combining their GPS signals (if any) with other signals in the Wi-Fi bands and other indications as known in the art. The client devices may have an app installed that facilitates communication with the AP and indicates to the AP whether or not the client device will share its current location estimate. In embodiments, a user of a client device may be presented with an option to share its location with its associated AP or not. The AP may request a location estimate from the client device by communicating with the app. Alternatively, the controller may communicate with the client device's app on the AP's behalf to acquire the client's location estimate.

The AP may use an algorithm itself to predict its most likely location based on the various inputs it received, or it may contact another device or server, provide the information and receive an estimated location with an estimated location error. An AP or a location server may use standard techniques of localization and triangulation to predict the AP's location from the gathered data.

The AFC database (at the AFC system 115) may utilize a buffer to compensate for potential inaccuracies with respect to the location information carried by a query. The AFC database may identify one or more frequencies available to the respective device (e.g., AP 105), wherein the available frequencies are based upon the determination of whether the respective device is located within an exclusion zone. Further, the database may identify one or more operating requirements, such as transmit power level, based upon the determination of whether the respective device is located within an exclusion zone. The database may send a list of the available frequencies to the respective device, and the respective device may begin operating according to any operating requirements at an available frequency identified from the list.

In embodiments, a device registered with the AFC database may send heartbeat messages to the database in order to ensure that exclusion zone data is current and to confirm that the device is active. A device may deregister from the AFC database when a determination is made that the device has been moved by more than a threshold distance (e.g., 50 m, 100 m, etc.), when a heartbeat message is not received for longer than a certain duration (e.g., 24 hours, etc.), or in response to another triggering event.

If an AP is providing high reliability services, the AP may register with more than one AFC and retain records for the at least two different AFC responses providing channel availability and power levels. The AP may choose to use one AFC's response over another AFC's response if the responses differ, or it may choose to comply with the union of the two responses.

Figure 2:
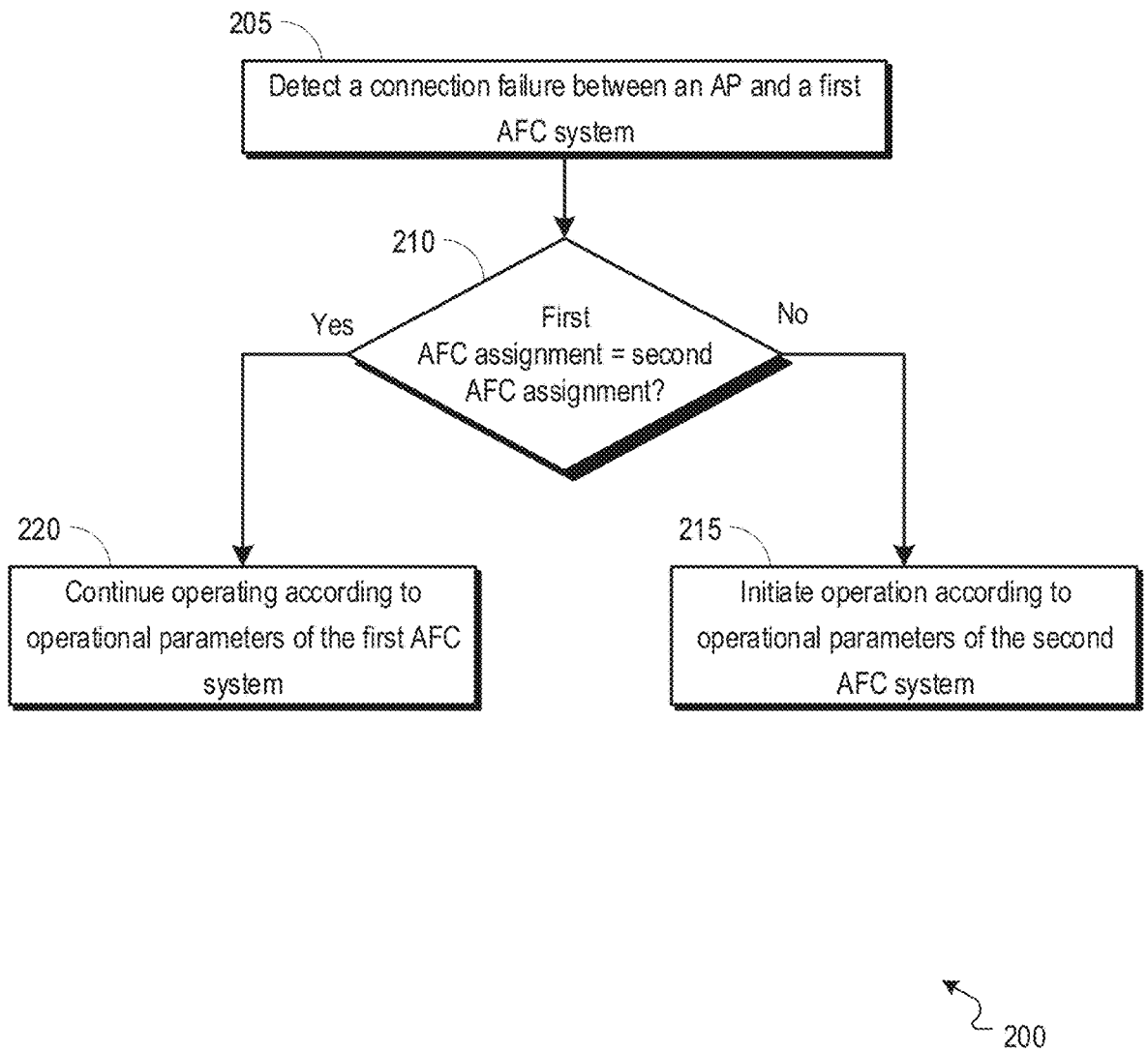
FIG. 2 is a flowchart showing an example process for utilizing registration information from two AFC systems.

FIG. 2 is a flowchart showing an example process for utilizing registration information from two AFC systems. At 205, a connection failure between an AP and a first AFC system may be detected. For example, if the AP cannot contact one AFC for the daily heartbeat message and assignment confirmation, then the AP can continue to operate in compliance with an assignment given by a second AFC. At 210, the AP may determine whether the operational parameters of the first AFC are the same as the operational parameters of a second AFC with which the AP has registered. If the operational parameters for the first AFC and the second AFC are not the same, the AP may initiate operation according to the operational parameters of the second AFC system at 215. For example, if the AP chose to use an assignment from the first AFC that was not a part of the second AFC's assignment, then the AP will have to change channel and redirect its stations to the new assignment. If the operational parameters of the first AFC and the second AFC are the same, the AP may continue operating according to the operational parameters of the first AFC at 220. For example, if the AP chose an assignment in compliance with both AFCs' allotments, then the AP need not make any changes in operation. The AP may choose to align its heartbeat messages to maximize its holdover operation time should it lose communication with all of its AFCs. For example, with one AP communicating with 2 AFCs, the AP may choose to space the heartbeat messages 12 hours apart, so that if the AP loses all communications with both AFCs, the most recent heartbeat message will be at most 12 hours old.

A monitoring site already in position for CBRS may be enhanced to also collect signatures of radio traffic in various bands outside the CBRS band. It had been true that radios were fairly dedicated to specific frequency ranges, but as software defined radios (SDR) with flexible front ends have improved in performance and cost-effectiveness, that limitation is less accurate. If an SDR is being used for reception only, some of the concerns that attach to SDR are mitigated. One common concern is that the filtering for out-of-band emissions for SDR transmitters is difficult or expensive. If the SDR is only operating as a receiver, that concern is minimized.

6 GHz devices may also include 2.4 GHz and/or 5 GHz radios. This allows an AP, for example, to provide only minimal beaconing in its 6 GHz allotted channel because its 5 GHz beacon can include information about any 6 GHz interfaces. For example, the AP may advertise a 6 GHz SSID through a beacon provided by a 2.4 or 5 GHz radio of the AP.

If a 6 GHz device, such as an AP or mesh station, does not include an LTE radio, one or more of its clients or associated devices may, such as a cell phone. In that case, an AP, for example, might ask its clients for information about networks seen over the air, even if it does not request an actual location determination from those devices.

The AFC database may alternatively receive information such as 5 and 6 GHz signals received by the device seeking to register. The information about 5 and 6 GHz signals received may include SSIDs from Wi-Fi APs, as well as frequencies where energy was detected above a threshold in the 5 and 6 GHz bands. The information about 5 and 6 GHz signals received may include signal strengths associated with the received signals as well as angular directions.

The database may correlate received energy signatures with known 6 GHz fixed microwave deployments to determine a device's probable location. Known 6 GHz microwave deployments may be registered with their frequency usage and locations. Detection of a certain pattern of 6 GHz signals can be matched against known deployments to allow the AFC database to estimate where a device would have to be to receive that pattern of 6 GHz signals. For example, fixed microwave links in the 6 GHz band are known to be 30 MHz wide and to exist in pairs. The database would consider not only the detected 6 GHz signal in making a frequency assignment for a requesting device that reports receiving at least one 30 MHz signal in its 6 GHz scan. Detection of one 30 MHz wide signal necessarily implies that the matching paired signal may also potentially be affected if the device begins transmissions in the frequencies assigned to the paired signal.

Figure 3:
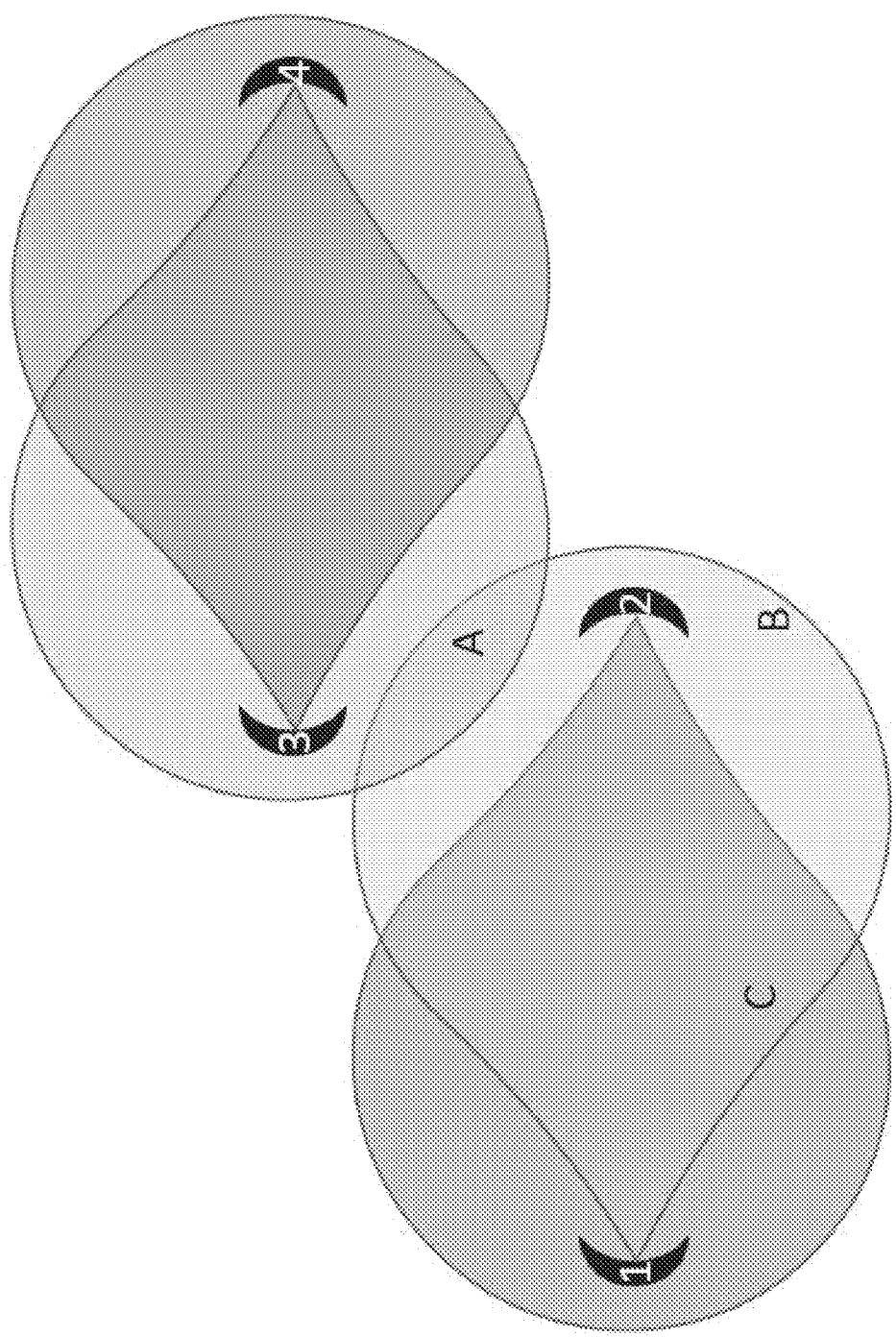
FIG. 3 shows an example correlation of received energy signatures with known fixed microwave deployments to determine a probable location of an access point.

As can be seen in FIG. 3, the AFC database or a location determination proxy for the APs may correlate received energy signatures with known fixed microwave deployments to determine a probable location of an access point. FIG. 3 shows a range of possible device locations, A, B and C. A device at location A could report seeing frequency 1 and frequency 4. A device at location B might report seeing only frequency 1 and a device at location C might report seeing frequencies 1 and 2. For location C, the database could have confidence that any assignments must avoid frequency 1 and frequency 2. For location A, the database, knowing that A could see both frequency 1 and frequency 4, could estimate the location of A as probably being close enough to receiver 2 and receiver 3 that any assignment to the device at location A must avoid frequencies 2 and 3 as well as 1 and 4. When considering location B, the database would need to consider other information, such as if other 6 GHz signals were seen, or if any SSIDs were seen to determine whether to avoid frequency 2.

Similarly, the database may correlate the received SSIDs with known SSID locations to determine a device's probable location. The database may combine the various estimations to form an estimate with greater confidence. If the estimates formed based on different information sources do not indicate the same location within a certain amount of uncertainty, then the database may choose which estimates to rely upon to make a registration decision, or it may reject the registration request entirely. The relative signal strengths and directions may be combined with the location estimation to determine if the information provided is credible.

The database may also use the relative signal strengths and directions to determine the transmit power level allowed for a device as well as an allowed frequency block. For example, a device that reports very low signal levels for 5 and 6 GHz received signals may be within a building so that those other signals reach it only faintly. In this case, the database could allow that device to use a higher transmit power safely because its transmissions will also be attenuated heavily before they reach any 6 GHz fixed microwave operations.

Location Awareness

Figure 4:
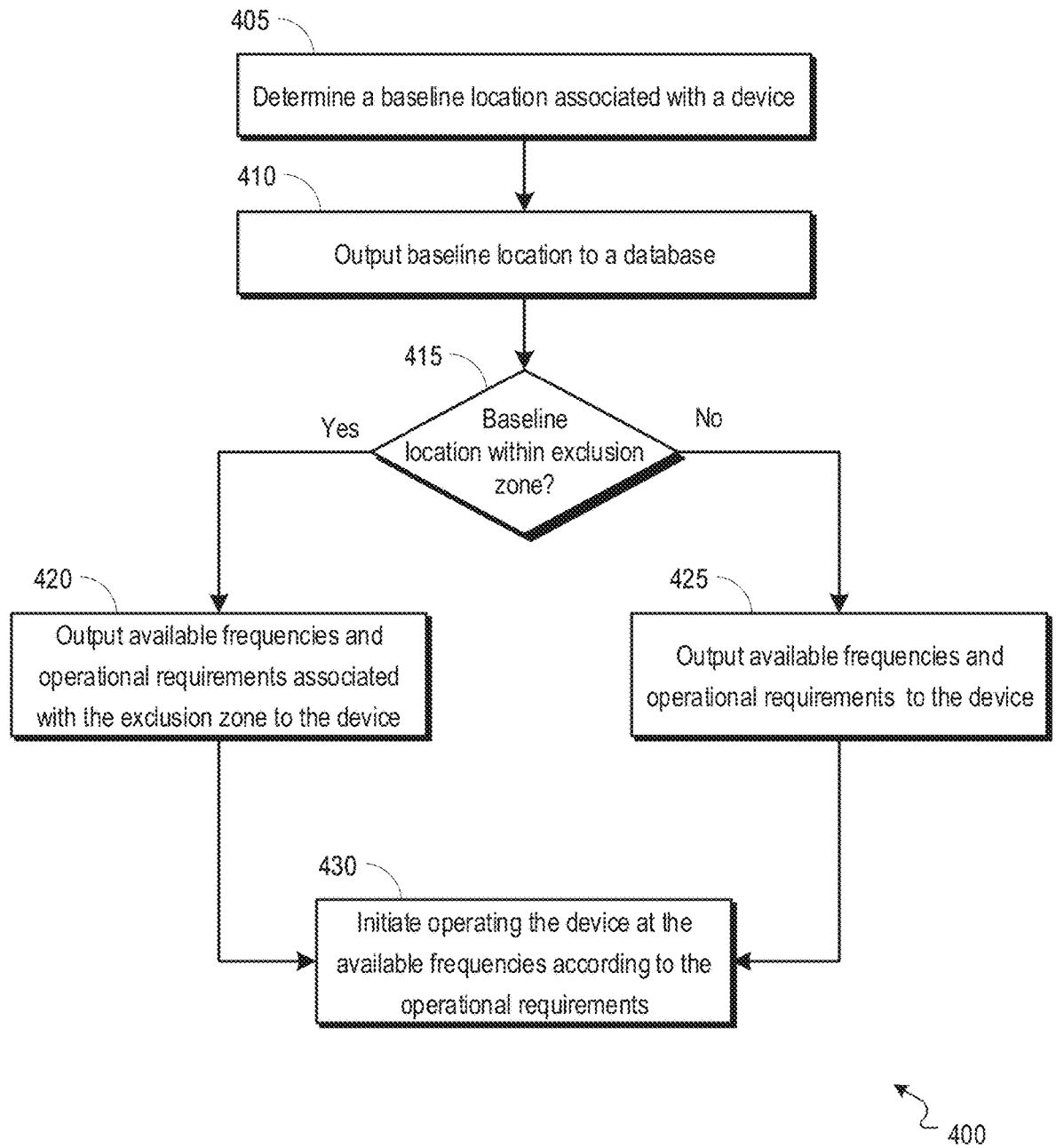
FIG. 4 is a flowchart showing an example process for determining operational requirements and available frequencies for a device based upon a determination of a baseline location associated with the device.

FIG. 4 is a flowchart showing an example process 400 for determining operational requirements and available frequencies for a device based upon a determination of a baseline location associated with the device.

A baseline location associated with a device (e.g., AP 105 of FIG. 1) may be determined at 405. For example, the device, or a related upstream device, may determine the baseline location of the device when the device is installed or in response to a triggering event (e.g., movement of the device, reboot of the device, etc.). The baseline location may be output to a database (e.g., database of an AFC system 115 of FIG. 1) at 410. At 415, the AFC system may determine whether the baseline location of the device is within one or more exclusion zones. If the baseline location of the device is within one or more exclusion zones, the AFC system may output to the device, available frequencies and one or more other operational requirements associated with the one or more exclusion zones at 420. If the baseline location of the device is not within an exclusion zone, the AFC system may output to the device, available frequencies and operational requirements at 425. At 430, the device may initiate operation at the available frequencies according to the one or more operational requirements.

The device, or a related upstream device, may be configured to determine that the device has moved by comparing a current location of the device to a baseline location of the device (e.g., the location information automatically determined or manually entered during an install or initial setup of the device). Additional description for comparing a current location of a device to a baseline location of the device to determine that the device has been moved may be found within U.S. application Ser. No. 15/131,693, entitled "Detecting Device Movement through Electronic Fingerprint Analysis," filed on Apr. 18, 2016. The disclosure provided by U.S. application Ser. No. 15/131,693 is incorporated herein. The device may respond to a determination that a current location of the device differs from the baseline location of the device by initiating an action for ensuring compliance with regulatory requirements. The device may be configured to initiate an action for ensuring compliance with regulatory requirements only when the difference between the current location of the device and the baseline location of the device exceeds a certain threshold. Actions for ensuring compliance with regulatory requirements may include, but are not limited to, the following: halting AFC-regulated operation; reducing transmit power; changing channel to a channel that does not require AFC-regulated operation; powering down the device; and others.

Figure 5:
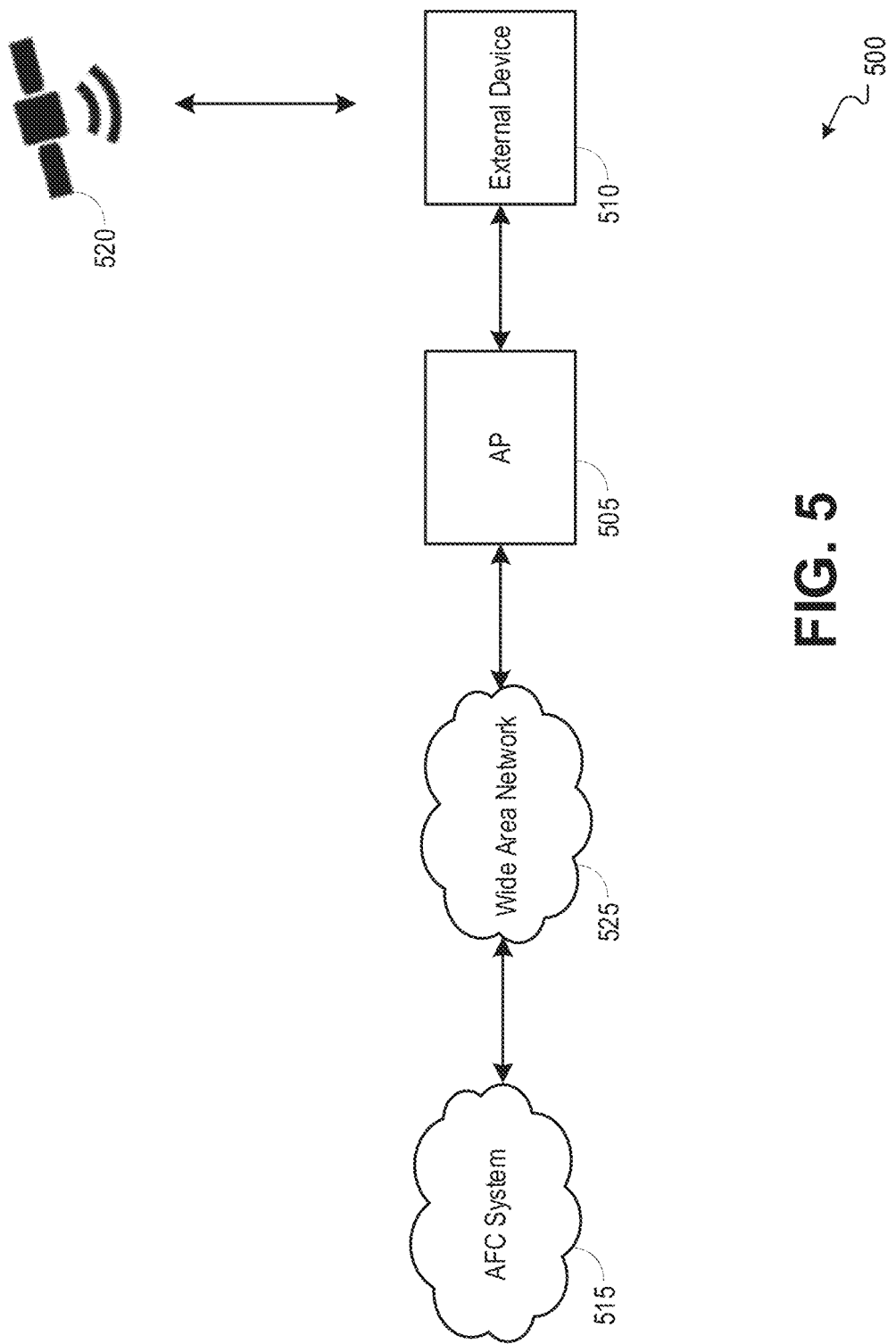
FIG. 5 is a block diagram illustrating an example network that enables geo-location for mains-powered non-GNSS (global navigation satellite system) based devices, with multiple applications including SAS and AFC.

FIG. 5 is a block diagram illustrating an example network 500 that enables geo-location for mains-powered non-GNSS (global navigation satellite system) based devices, with multiple applications including SAS and AFC. Geo-location is becoming a basic requirement for many new applications. The expense for adding GNSS location hardware to certain devices may be cost prohibitive, thus ruling out these applications. Some new communication systems may require geo-location services in order to query a regulatory database to check if they are entitled to operate in a specific location. The need to include GNSS hardware with equipment providing these new communication systems may be burdensome and cost prohibitive. In the case of CBRS and the unlicensed use of 6 GHz, device location is essential to allow these services to operate. Both of these systems require location lookup to confirm if operation is allowed, and what constraints such operation is subject to. The deployed lookup system for CBRS is called Spectrum Access System (SAS), while the system for 6 GHz is called Automated Frequency Coordination (AFC). In the case of 6 GHz operation, basic operation at low power levels for indoor operation (also referred to as low power indoor operation (LPI)) may avoid the need to use AFC lookups before operating, however there is an advantage to using AFC to potentially enable standard indoor power levels, bringing 6 GHz operation up to existing UNII-2-Extended power levels (without worrying about Dynamic Frequency Selection (DFS)).

In some instances, professional equipment may be able to absorb the cost of GNSS hardware, however, for mass residential deployments the additional cost of such hardware is prohibitive. The system described herein enables the use of adjacent connected technology to provide GNSS data to be used by a device when consulting SAS/AFC or similar systems, to confirm operation, without requiring additional GNSS hardware in the device.

The AP 505 may include an adaptive movable access point (AMAP) system. Two broad interactions are described in a power on/off timeline. The first interaction describes how the AP 505 and a mobile application on an external device 510 (GNSS enabled mobile device/tablet/etc.) may be setup to communicate with each other over an authenticated link (e.g., Wi-Fi), and the external device 510 may securely exchange the GNSS information to the target device (e.g., AP 505), which would in turn use this within the IAM (identity and access management) authenticated service link in order to retrieve SAS or AFC related information from an AFC system 515 (e.g., the AP 505 may communicate with the AFC system through a connection to a WAN 525). For example, the external device 510 may be configured to retrieve location information from a GNSS 520, the location information being associated with the physical location of the external device 510. The GNSS data (e.g., location information) may remain within the target device (e.g., AP 505) until a power off event. For example, when the AP 505 is powered on, the AMAP may initiate and the AP 505 may initiate 6 GHz communications at low power (e.g., 200 mW). The AP 505 may connect to a mobile application (e.g., application running at the external device 510), and the AP 505 may receive location information (e.g., GPS data/coordinates) from the external device 510. The AP 505 may output an AFC request to an AFC system 515, wherein the AFC request includes the location information. The AP 505 may receive an AFC response from the AFC system 515, wherein the response either approves or denies the AP request to operate within the 6 GHz band at high/normal power. If the AFC response approves the AP's use of the 6 GHz band, the AP 505 may switch to operating within the 6 GHz band at high/normal power levels (e.g., 1 W). When the AP 505 powers down, the AP 505 may lose the AFC details received from the AFC response. In the subsequent interaction (e.g., when the AP 505 returns to a power on state), the target device (e.g., the AP 505) powers on and waits to have the external device 510 connect using the mobile application. If the AP 505 cannot connect to the external device 510, the AP 505 will not receive the GNSS location information. For example, the AMAP system may be initiated, and the AP 505 may initiate 6 GHz communications at low power (e.g., 200 mW). The absence of a new connection to deliver GNSS information means that 6 GHz 1 W operation cannot be enabled.

In embodiments, the system relies on an external device 510 with an existing embedded GNSS system to communicate GNSS data to the target device (e.g., AP 505) that needs GNSS data, using a secure authenticated connection between the two devices, primarily based on a Wi-Fi connection offered by the target device. The target device is typically AC powered and may generally need to be powered down if it is moved to a new location. The system relies on the fact that a pre-authenticated device can provide authentic GNSS data when connected, and this information may be provided via a Wi-Fi connected device, operating on a logical Wi-Fi link connected to the target device. Once the GNSS information has been synchronized to the target device, the target device maintains this information in dynamic memory, losing all GNSS information upon power loss or reboot. While powered on, the target device can reuse the GNSS information to support any SAS/AFC related queries it may be required to perform. The proximity of the external device is proven through the Wi-Fi connectivity requirement, ensuring that both the external and target device are within a predetermined proximity to each other (e.g., <50 m).

Another aspect of the system is to enable the target device to communicate with the AFC in a secure authenticated manner. One potential option, that is very cost effective for device authentication and basic information sharing is the utilization of a cloud-based platform (e.g., Google IAM service). This is useful for any large scale usage such as residential Wi-Fi AP deployments (either service provider or retail). Embodiments of the AFC service may provide a solution that is highly scalable, and may be able to offer daily lookup service for many devices (e.g., on the order of 100,000 s or 1,000,000 s).

In embodiments, access may be gained to a database of AP SSIDs linked with locations. Such a database may be offered as a service where a device can survey the APs that it can hear and ask the database where the device is most likely physically located based upon a report of what it can hear.

An AFC may offer similar services using a wider network of networks. An AFC may use data from its own sensors to gather information about locations. An AFC's own sensors' locations may be well known, allowing information from sensors with well-known locations and well-known antenna patterns to be trustworthy. An AFC may accept information from devices already having trustworthy accepted locations about 6 GHz signals, Wi-Fi APs (SSIDs and RSSI) and/or LTE or 5G base stations or microcells. Also available in some areas and from certain devices or sensors could be 900 MHz signals for Wi-Fi HaLow, Lora, SigFox or other such signals. The AFC may use that information, when the device is trusted, to enhance its mapping ability. It may also doublecheck location information from new devices seeking authorization by requesting information from that untrusted device about other signals it has detected. If the other information matches to within a certain degree of error the location information provided by the new device, then the AFC would have additional confidence that its reported location is correct. On the other hand, if the location information from the device does not agree with the wireless environmental information provided by that device, then the AFC may not choose to trust that device or provide it with a high power channel authorization.

Alternatively, a device might use an available service to determine its location in lieu of having the ability to determine its location through access to a GPS or through the use of cellular location services. When the device reports its location to an AFC, it may provide a margin of error for that determination based on a factor returned by the location service.

Database Management

A controller or database may be utilized to store exclusion zone data associated with areas in which unlicensed band usage may impact microwave paths. The controller or database may include or may be a part of the AFC system. Updates to exclusion zone data may be pushed to the controller or database or may be pulled by the controller or database from one or more sources of exclusion zone data. Exclusion zone data may include one or more geographic locators (e.g., GPS coordinates, etc.) making up boundaries of exclusion zones or that are otherwise positioned within boundaries of exclusion zones. Exclusion zones may be areas that have been designated as areas in which unlicensed band usage may impact microwave paths.

In embodiments, periodically or in response to certain triggers, the controller or database may identify one or more devices that are operating at a location that falls within a region that is the subject of an update which has been made to the exclusion zone data. For example, when an update to exclusion zone data is received, the controller or database may check location information associated with one or more devices to determine whether the location information of any of the one or more devices indicates that the device is located within an area that is affected by the update. As another example, the controller or database may periodically (e.g., hourly, daily, weekly, etc.) determine whether the location information of any of the one or more devices indicates that the device is located in an area that is affected by an update made to the exclusion zone data during the certain duration covered by the period. In response to a determination that a device is located within an area that is affected by an update to the exclusion zone data, the controller or database may output updated frequency information (e.g., AFC operational requirements) to the device.

Figure 6:
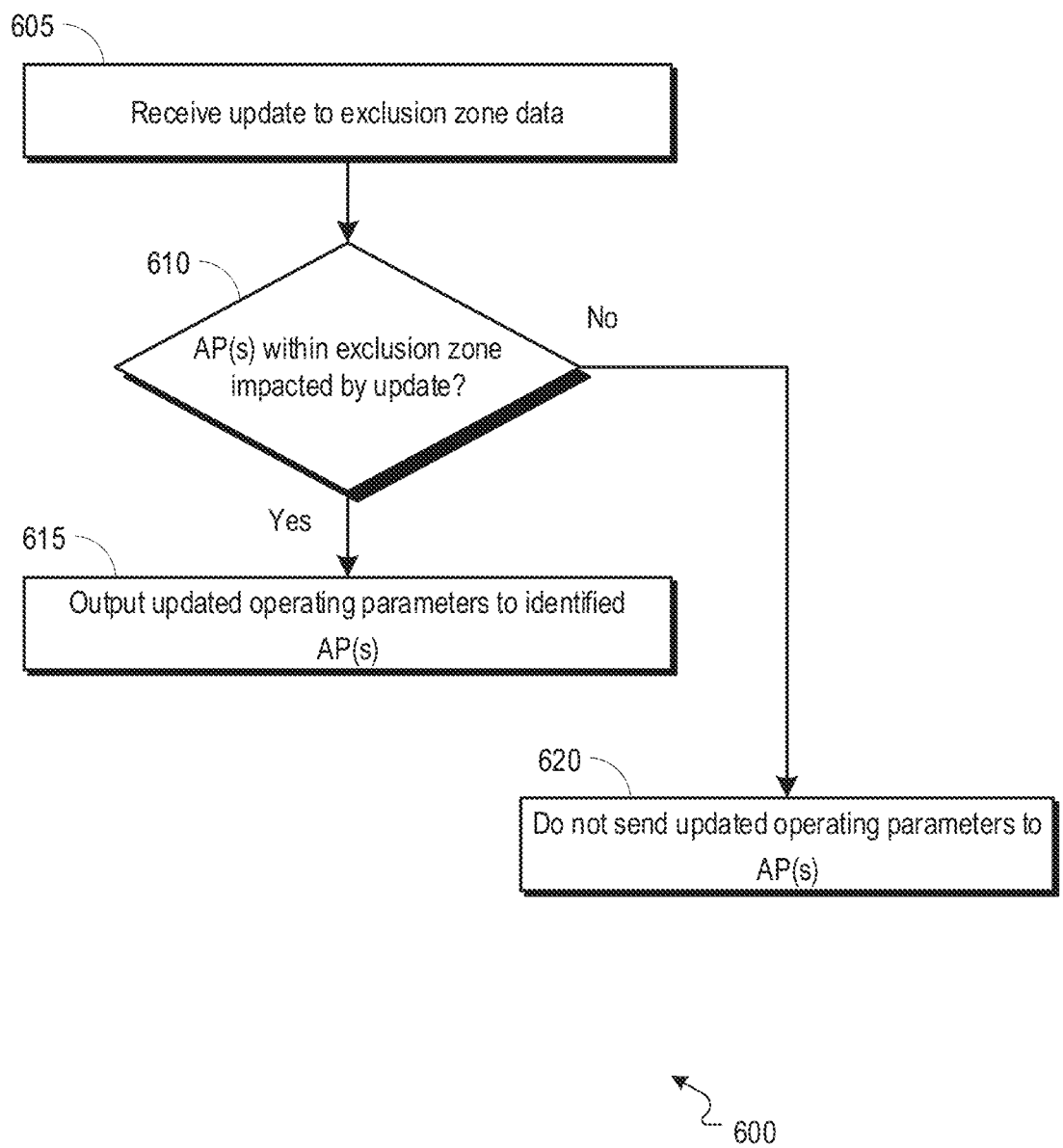
FIG. 6 is a flowchart showing an example process for updating AP operating parameters based upon an update to exclusion zone data.

FIG. 6 is a flowchart showing an example process 600 for updating AP operating parameters based upon an update to exclusion zone data. At 605, an update to exclusion zone data may be received, for example, at an AFC system. At 610, a determination is made whether one or more APs are within an exclusion zone impacted by the update. If an AP is within an exclusion zone impacted by the update, the AFC system may output to the AP, updated operating parameters at 615. If an AP is not within an exclusion zone impacted by the update, the decision may be made not to send updated operating parameters to AP(s) at 620.

Figure 7:
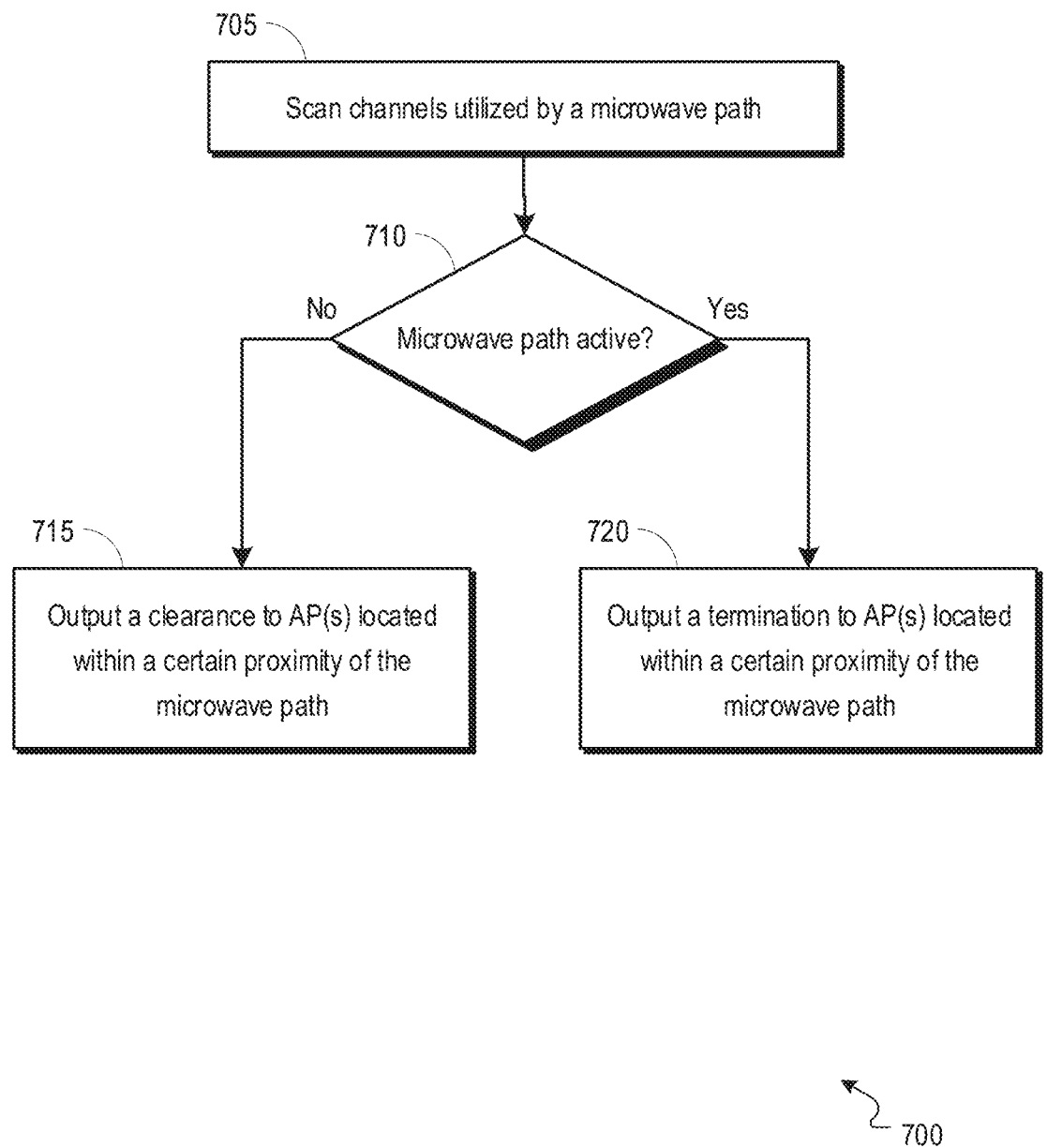
FIG. 7 is a flowchart showing an example process for clearing or terminating usage of channels by one or more APs based upon a scan of channels utilized by a microwave path.

In embodiments, the controller or database may include channel scanning functionality or secure and authenticated access to external channel scanning functionality. FIG. 7 is a flowchart showing an example process 700 for clearing or terminating usage of channels by one or more APs based upon a scan of channels utilized by a microwave path. At 705, the controller or database may scan channels utilized by microwave systems to determine whether the microwave path associated with a microwave system is active at 710. If the determination is made that the path is not active, the controller or database may clear one or more devices located within an area associated with the path to use the channel(s) associated with the microwave path at 715. If the determination is made that the path is active, the controller or database may terminate usage of associated channels by one or more devices located within the area associated with the path at 720.

In embodiments, the controller or database may maintain a schedule of band usage by one or more microwave systems. The controller or database may clear or terminate channel usage at one or more devices based upon the schedule.

In embodiments, the controller or database may generate a schedule of band usage by one or more microwave systems. The controller or database may monitor channel usage by the one or more microwave systems and may record times/days during which the microwave systems are active. Based upon the monitored channel usage, the controller or database may generate a schedule of daily/weekly/yearly use. The controller or database may clear or terminate channel usage at one or more devices based upon the schedule.

In embodiments, the controller or database may direct one or more devices (e.g., one or more devices within an MDU (multiple dwelling unit), campus, etc.) to use certain frequencies based upon frequencies used by other devices. The controller may also direct other devices to alter their power levels or to use directed null forming to avoid causing interference. For example, the controller or database may allocate 6 GHz channels among a group of APs that are within a certain proximity of each other, wherein the allocations are made on a non-interference basis.

In embodiments, a device (e.g., an AP) may receive communications indicating that a microwave path with which the device has been associated based upon a current location of the device has become active or inactive. For example, a beacon positioned in close proximity to a microwave system may determine a current state of the microwave system. When the state of the microwave system changes (e.g., when the corresponding microwave path becomes active/inactive), the beacon may output notifications indicating the state change to one or more devices that are located within an exclusion zone associated with the microwave path. For example, the notifications may include clearances or termination requests that notify the one or more devices that one or more frequencies have become available or unavailable. Further, the notifications may notify the one or more devices that operational requirements either may be temporarily ignored or should be adhered to based upon the identified state change.

In embodiments, an AP may scan a channel to determine whether a 6 GHz band is available. For example, an AP operating at low power may carry out a scanning of the 6

GHz band as a background operation. If signals are detected on the 6 GHz band, the AP may refrain from using the 6 GHz band or may alternatively remain at low power until the 6 GHz band is clear.

Operational Deployment

In embodiments, an AP may have both a 6 GHz radio and another radio (e.g., 2.4 or 5 GHz radio). If a 6 GHz AP has a legacy band (2.4 or 5 GHz) and a 6 GHz STA also has legacy capabilities, then the AP may advertise in the legacy band its 6 GHz capabilities. In embodiments, a device may be configured with a 2+5+6 solution. In embodiments, a device may be configured with a 2+5+5/6, wherein one of the radio chains is switchable between 5 GHz and 6 GHz.

If the units are a bookend solution and/or controlled by a home networking controller, a home networking controller may direct a STA/extender to a specific 5 or 6 GHz channel depending upon the STA's 5 GHz RSSI. The controller may consider the performance of similar stations already attached at 6 GHz to determine whether or not the STA should be directed to the higher band. If the higher channel has a very wide channel with little or no interference, then the controller may choose to move the STA.

Figure 8:
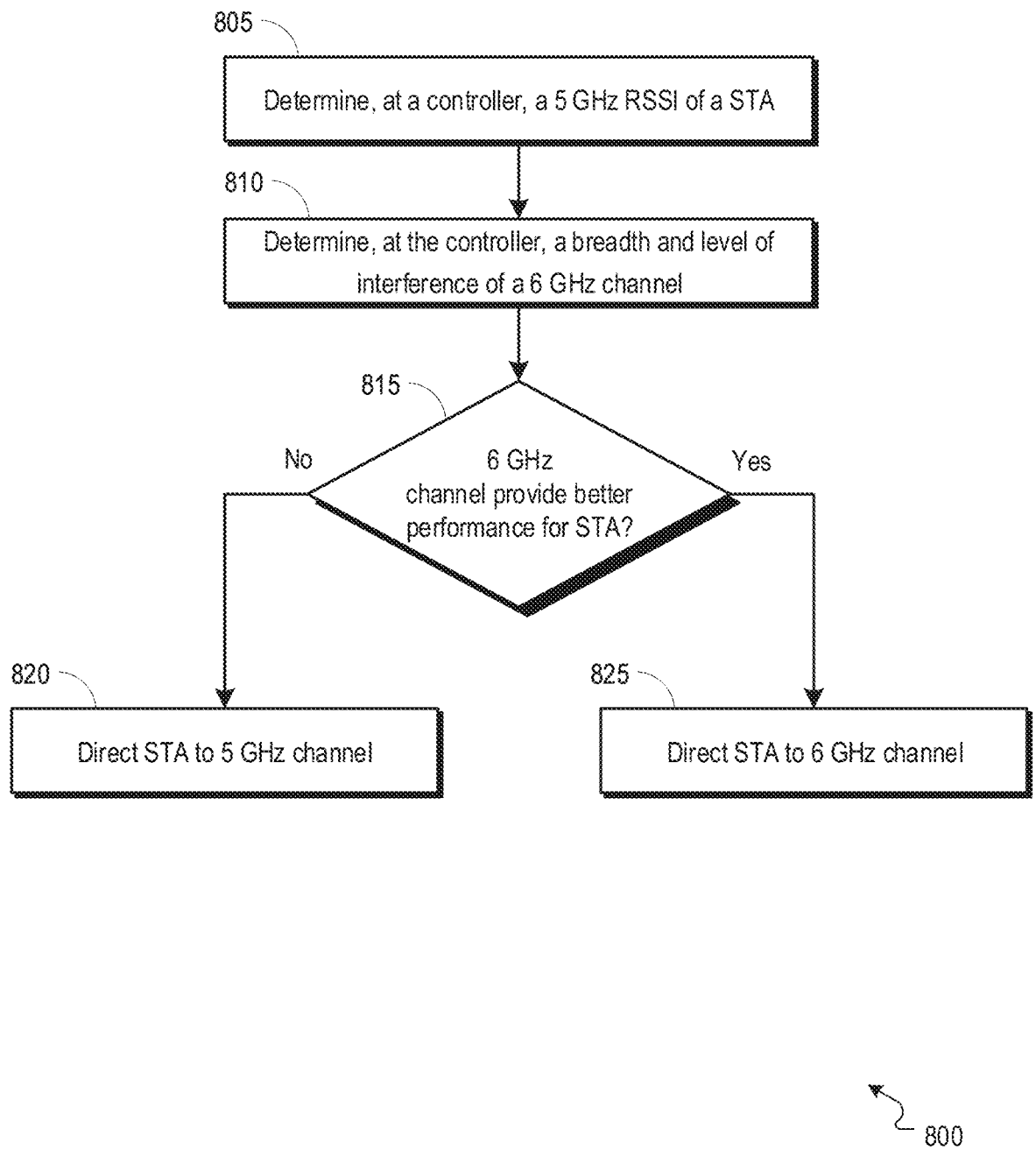
FIG. 8 is a flowchart showing an example process for directing a STA to specific channel based upon potential operating performance at a 6 GHz channel.

FIG. 8 is a flowchart showing an example process 800 for directing a STA to specific channel based upon potential operating performance at a 6 GHz channel. For the controller to make good decisions, it needs access to the AP's AFC channel/power assignments. The APs might handle the request process independently and keep the controller up to date on any assignments or refusals. As the controller decides which band to assign a station to, the controller may consider the STA's current RSSI as well as RSSI history, as well as the channel assignments and power level limits of the APs it controls. At 805, the controller may determine a 5 GHz RSSI of a STA. At 810, the controller may determine a breadth and level of interference of a 6 GHz channel. At 815, the controller may determine whether the 6 GHz channel may offer better performance for the STA than the currently used 5 GHz channel. If the determination is made that the 6 GHz channel does not offer better performance for the STA, the controller may direct the STA to the 5 GHz channel at 820. If the determination is made that the 6 GHz channel does offer better performance for the STA, the controller may direct the STA to the 6 GHz channel at 825.

Figure 9:
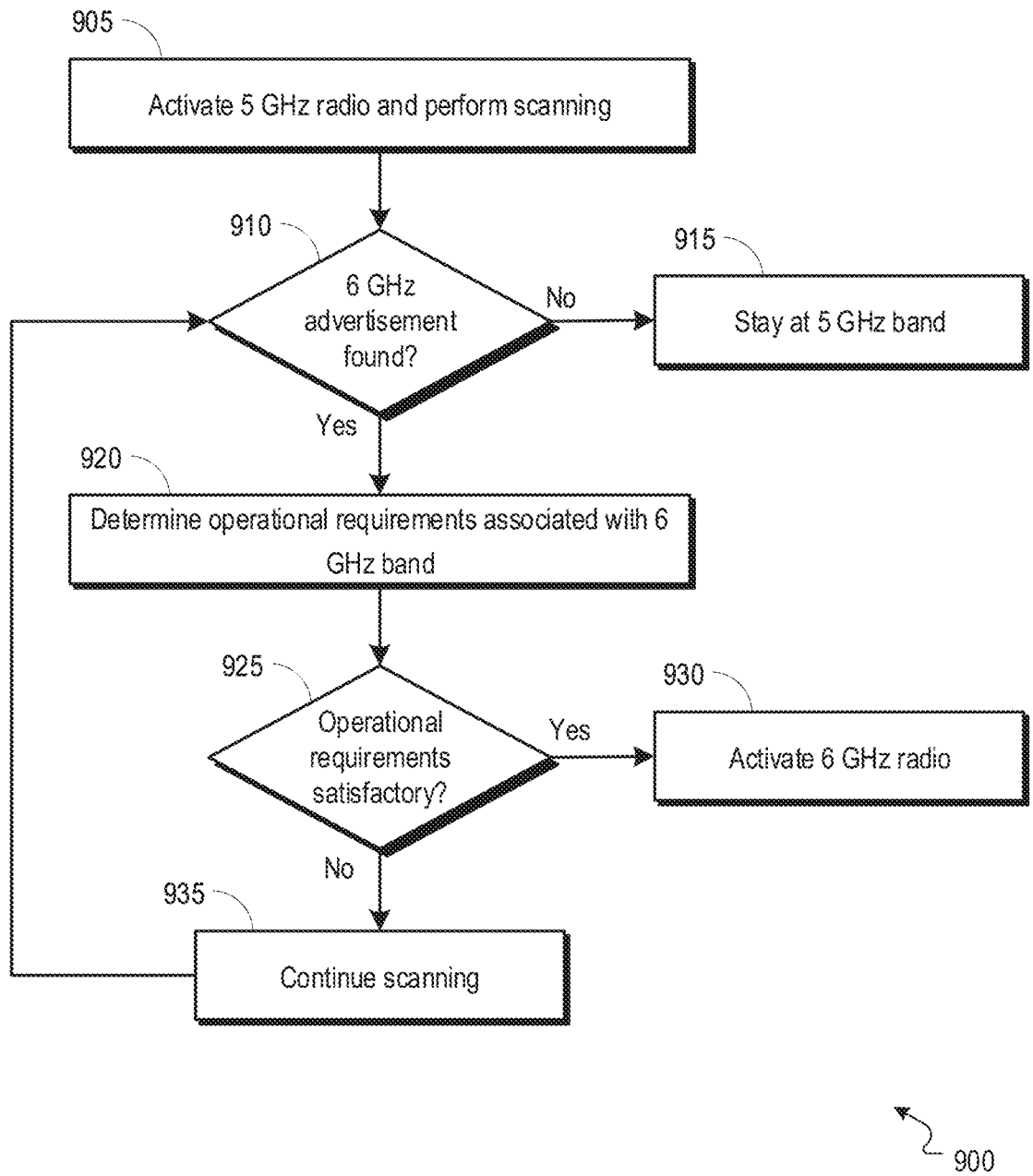
FIG. 9 is a flowchart showing an example process for scanning for a satisfactory 6 GHz channel.

FIG. 9 is a flowchart showing an example process 900 for scanning for a satisfactory 6 GHz channel. If the units are un-related, a STA may turn on and activate its 5 GHz radio and perform normal scanning at 905. If a 6 GHz advertisement is not found at 910, the STA may stay at the 5 GHz band at 915. If an AP is found that also advertises a 6 GHz capability at 910, the STA can consider which 6 GHz channel/band is included in the AP's information. For example, the STA may determine operational requirements associated with the 6 GHz band at 920. Since the US current regulatory proposals indicate that the power level may be set by channel, the STA may take that into consideration. If the determination is made at 925 that the operational requirements of the 6 GHz band are satisfactory to the STA, the STA may activate a 6 GHz radio at 930. If, at 925, the STA determines that the operational requirements of the 6 GHz band are not satisfactory, the STA may continue scanning at 935. For example, if the channel is a low power channel, the STA may preferentially keep looking until it finds an AFC/high power channel.

In embodiments, multiple APs may coordinate to maximize efficiency of band usage between the multiple APs. For example, the APs may coordinate use of the large bands based upon the varying regulatory requirements associated with each of the bands.

With the potentially lower power limits (at least for a while), spreading STAs across multiple APs may be helpful to use the wide bandwidth to bring up the data rate. A deployment constrained to a low power level, such as 250 mW, may require more APs to cover the same area compared to a standard 5 GHz AP (1 W).

A collection of APs that are centrally coordinated can send in separate AFC requests and a central coordinator might choose how to distribute the STAs based on the responses. In embodiments, a controller may direct an AP to resend its request if the results are not acceptable.

STAs may be directed to go from standard power to low power or to evacuate the band if an AFC withdraws the previously allowed channel(s) from an active AP.

In embodiments, an AFC may withdraw a channel allocation at any time. If an AP receives a withdrawal notice from the AFC, the AP may notify all STAs that they must at least drop to low power. If the operational parameters do not allow the STAs to change their power level and remain on the channel, then the AP may direct the STAs to shift to a non-6 GHz band until the AP can obtain a new assignment from the AFC.

Timing Distribution/Low Latency Services/QoS

PTP (IEEE-1588) allows distribution of timing over Ethernet. DTP (DOCSIS Timing Protocol) from CableLabs extended this technology over DOCSIS.

Motivation for 6 GHz Wi-Fi application: new unlicensed frequency band likely to have little interference for a while, especially if all four bands are opened. If only band 6 is open, that advantage will be short-lived.

This disclosure applies to a cable modem GW that also has Wi-Fi including 6 GHz (but not required). The CM supports DTP as does its supporting CMTS. The CMTS/CM could provide several different timing sources. As different mobile providers advance their networks from 4G to 5G at different rates, there may be different timing feeds available for different small cell/pico cell uses. The timing feeds may also be of different qualities (4G vs 5G 1 ms).

The AP can advertise its support for timing distribution or provide it later in a capabilities exchange. This notification could come via a field in the beacon or in a capabilities exchange after the STAs are associated. The notification could include multiple possible timing sources that the CM/AP may have available. The notification could also indicate the accuracy or quality of each potential timing source. A STA decides whether an AP can provide a timing feed that it needs. The STA can request the timing feed. If a STA wants to receive a timing distribution, it notifies the AP that that it wants to receive a timing distribution. That notification could indicate which timing source the STA is interested in and/or potentially a level of accuracy or quality that it needs to receive. The AP may evaluate whether it can provide the service that the STA has requested. The AP may need to communicate with the CM and/or the CMTS to ensure that the requested service and QoS level can be provided. The AP/CM passes that request back to the CMTS. If the CM/AP has to support multiple timing feeds then the CM may select which one to use for its internal systems, or it may not use any specific feed directly. If the AP can provide the STA with the service it requested, then it selects an OFDM/OFDMA downstream and upstream channel to carry the timing messages. For example, the timing messages may be carried over a selected 6 GHz channel. Note that the channel may actually be one or more resource units (RU) as known in 11*ax* with limited bandwidth, but that can be dedicated to this purpose. The AP and STA begin communicating over that RU according to a schedule developed by the AP to accommodate the QoS requirements of the service level that the STA had requested. The AP may choose a limited set of MCS settings for the channel to ensure predictability and good performance.

Figure 10:
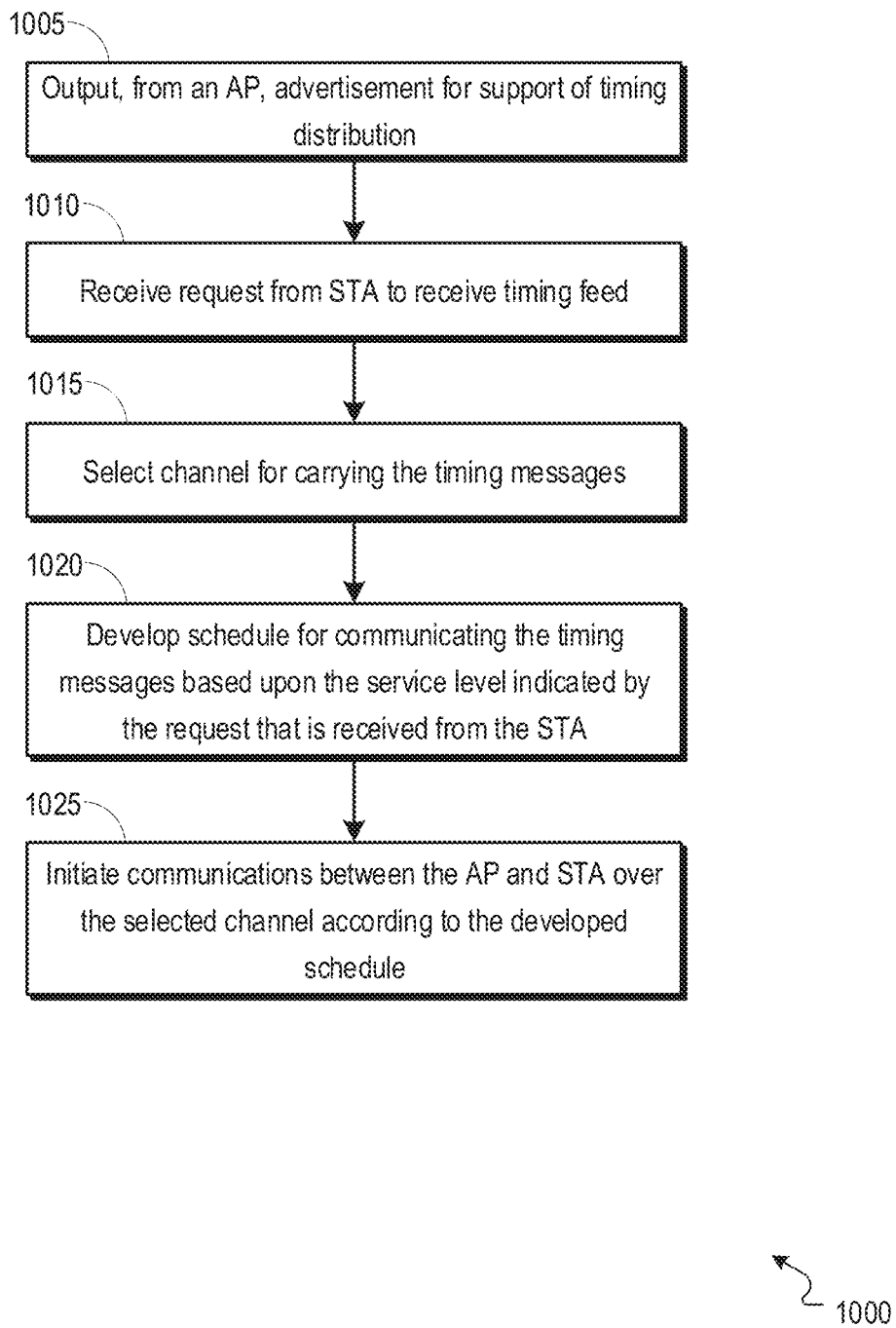
FIG. 10 is a flowchart showing an example process for establishing a timing distribution between an AP and STA.

FIG. 10 is a flowchart showing an example process 1000 for establishing a timing distribution between an AP and STA. At 1005, the AP may output an advertisement for support of timing distribution. At 1010, the AP may receive a request from a STA to receive a timing feed, wherein the request is output from the STA in response to the STA recognizing the advertisement. At 1015, a channel may be selected for carrying the timing messages. For example, the timing messages may be carried over a selected 6 GHz channel. At 1020, a schedule for communicating the timing messages may be developed based upon a service level indicated by the request that is received from the STA. At 1025, communications may be initiated between the AP and the STA over the selected channel according to the developed schedule.

Figure 11:
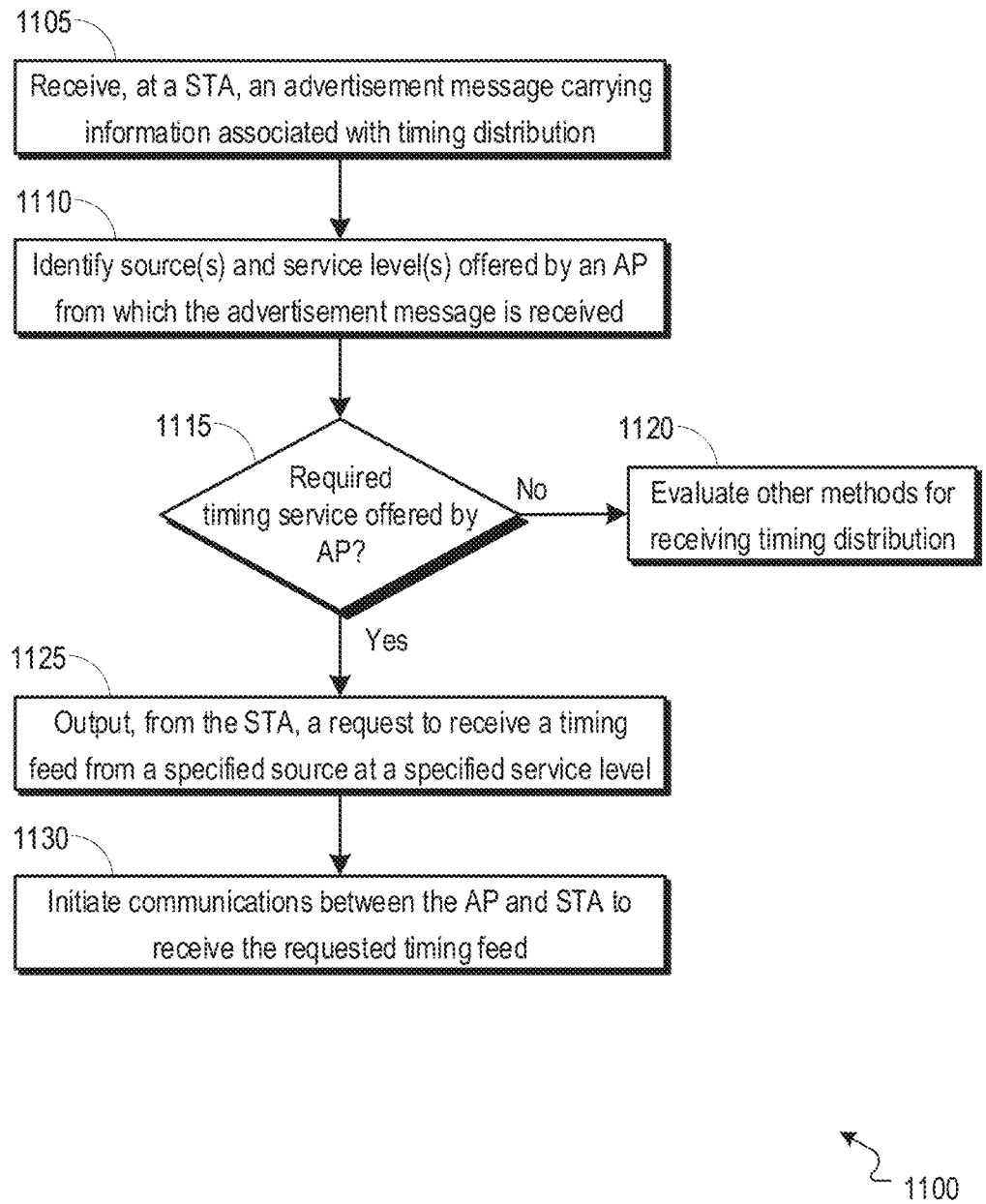
FIG. 11 is a flowchart showing an example process for establishing a timing distribution between an AP and STA, wherein the STA determines whether the AP offers the timing distribution from a certain source at a certain service level.

FIG. 11 is a flowchart showing an example process 1100 for establishing a timing distribution between an AP and STA, wherein the STA determines whether the AP offers the timing distribution from a certain source at a certain service level. At 1105, a STA may receive, from an AP, an advertisement message carrying information associated with timing distribution that is offered by the AP. At 110, the STA may identify sources and/or service levels offered by the AP. At 115, the STA may determine whether a required timing service is offered by the AP. If the required timing service is not offered by the AP, the STA may evaluate other methods for receiving a timing distribution at 1120. If the required timing service is offered by the AP, the STA may output a request to receive a timing feed from a specified source at a specified service level at 1125. At 1130, communications may be initiated between the AP and STA to receive the requested timing feed.

Figure 12:
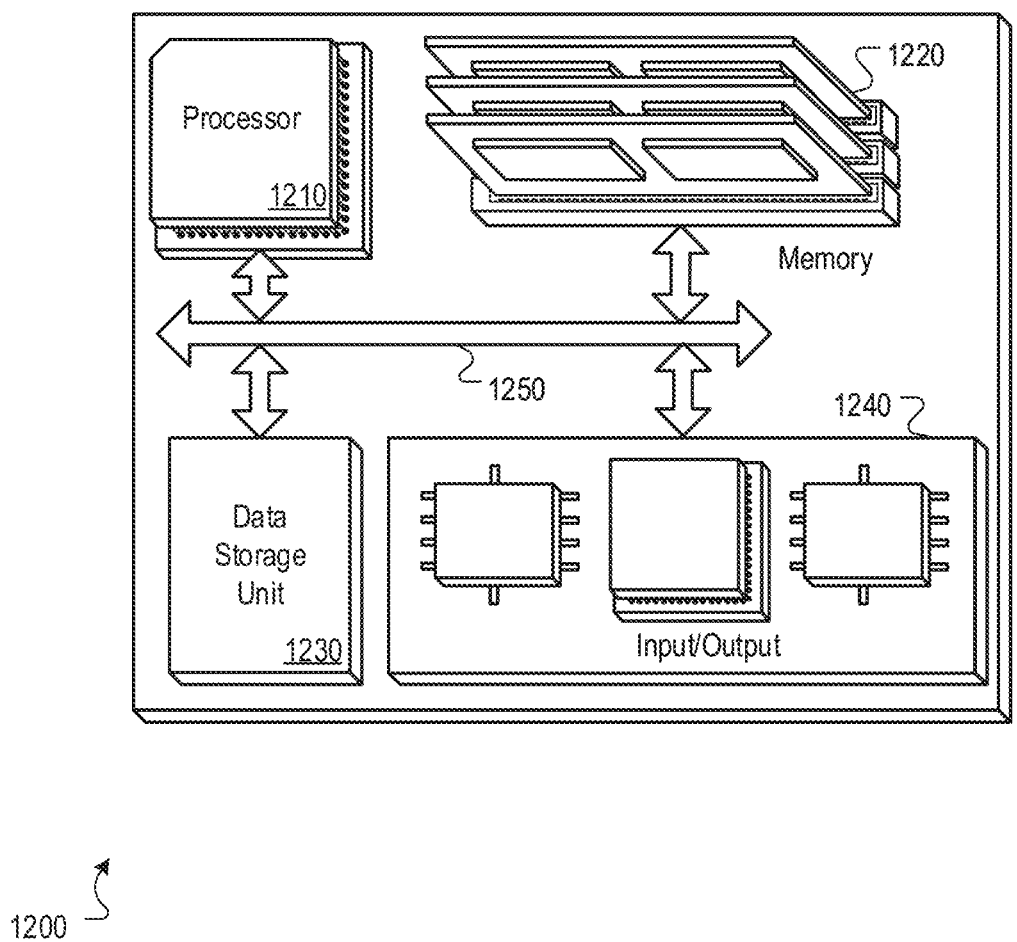
FIG. 12 is a block diagram of a hardware configuration operable to facilitate location determination, communications with an AFC system, configuring operational parameters in response to an identification of active 6 GHz paths, and timing distribution and low-latency services.

FIG. 12 is a block diagram of a hardware configuration 1200 operable to facilitate location determination, communications with an AFC system, configuring operational parameters in response to an identification of active 6 GHz paths, and timing distribution and low-latency services. The hardware configuration 1200 can include a processor 1210, a memory 1220, a storage device 1230, and an input/output device 1240. Each of the components 1210, 1220, 1230, and 1240 can, for example, be interconnected using a system bus 1250. The processor 1210 can be capable of processing instructions for execution within the hardware configuration 1200. In one implementation, the processor 1210 can be a single-threaded processor. In another implementation, the processor 1210 can be a multi-threaded processor. The processor 1210 can be capable of processing instructions stored in the memory 1220 or on the storage device 1230.

The memory 1220 can store information within the hardware configuration 1200. In one implementation, the memory 1220 can be a computer-readable medium. In one implementation, the memory 1220 can be a volatile memory unit. In another implementation, the memory 1220 can be a non-volatile memory unit.

In some implementations, the storage device 1230 can be capable of providing mass storage for the hardware configuration 1200. In one implementation, the storage device 1230 can be a computer-readable medium. In various different implementations, the storage device 1230 can, for example, include a hard disk device, an optical disk device, flash memory or some other large capacity storage device. In other implementations, the storage device 1230 can be a device external to the hardware configuration 1200.

The input/output device 1240 provides input/output operations for the hardware configuration 1200. In one implementation, the input/output device 1240 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.) or display device associated with a client device 105. In another implementation, the input/output device can include driver devices configured to send communications to, and receive communications from one or more networks (e.g., WAN 115 of FIG. 1, provider network 120 of FIG. 1, local network 130 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for a controller to identify one or more operating requirements for use by an access device comprising:
   receiving location information associated with the access device, wherein the access device is a Wi-Fi access device;
   sending the location information to the access device using a secure authenticated Wi-Fi connection;
   determining that the access device is within a proximity to one or more exclusion zones based upon a baseline location of the access device, wherein the baseline location is based on the location information and one or more Wi-Fi location determination features, and wherein the one or more exclusion zones correspond to one or more areas in which unlicensed band usage impacts one or more microwave paths;
   determining one or more frequencies to avoid based on the proximity of the access device to the one or more exclusion zones;
   identifying one or more operating requirements of the access device based on the proximity of the access device to the one or more exclusion zones; and
   outputting the one or more operating requirements to the access device.

2. The method of claim 1, further comprising:
   determining that the access device has moved by comparing a current location of the access device to the baseline location; and
   initiating an action for ensuring compliance with one or more regulatory requirements based on the determining that the access device has moved.

3. The method of claim 2, wherein the initiating the action comprises any of halting an automated frequency coordination (AFC) regulated operation, reducing a transmit power, changing a channel to a channel that does not require ACS-regulated operation, power down, or any combination thereof.

4. The method of claim 2, wherein the comparing the current location to the baseline location comprises determining that a difference between the current location and the baseline location exceeds a threshold.

5. The method of claim 1, wherein the determining that the access device is within the proximity to the one or more exclusion zones is based on an uncertainty associated with the baseline location.

6. The method of claim 1, wherein the one or more operating requirements comprises a maximum transmit power level, an allowed frequency block, or both.

7. The method of claim 1, wherein the one or more exclusion zones are designated areas in which unlicensed band usage impacts one or more microwave paths.

8. A device to identify one or more operating requirements for an access device comprising:
   a memory storing one or more computer-readable instructions; and
   a processor configured to execute the one or more computer-readable instructions to:
      receive location information associated with the access device, wherein the access device is a Wi-Fi access device;
      send the location information to the access device using a secure authenticated Wi-Fi connection;
      determine that the access device is within a proximity to one or more exclusion zones based upon a baseline location of the access device, wherein the baseline location is based on the location information and one or more Wi-Fi location determination features, and wherein the one or more exclusion zones correspond to one or more areas in which unlicensed band usage impacts one or more microwave paths;
      determine one or more frequencies to avoid based on the proximity of the access device to the one or more exclusion zones;
      identify one or more operating requirements of the access device based on the proximity of the access device to the one or more exclusion zones; and
      output the one or more operating requirements to the access device.

9. The device of claim 8, wherein the processor is further configured to execute the one or more computer-readable instructions to:

determine that the access device has moved by comparing a current location of the access device to the baseline location; and initiate an action for ensuring compliance with one or more regulatory requirements based on the determining that the access device has moved.

10. The device of claim 9, wherein the initiating the action comprises any of halting an automated frequency coordination (AFC) regulated operation, reducing a transmit power, changing a channel to a channel that does not require ACS-regulated operation, power down, or any combination thereof.

11. The device of claim 9, wherein the comparing the current location to the baseline location comprises determining that a difference between the current location and the baseline location exceeds a threshold.

12. The device of claim 8, wherein the determining that the access device is within the proximity to the one or more exclusion zones is based on an uncertainty associated with the baseline location.

13. The device of claim 8, wherein the one or more operating requirements comprises a maximum transmit power level, an allowed frequency block, or both.

14. The device of claim 8, wherein the one or more exclusion zones are designated areas in which unlicensed band usage impacts one or more microwave paths.

15. One or more non-transitory computer readable media of a device having instructions operable to cause one or more processors to perform the operations comprising:

receiving location information associated with the access device, wherein the access device is a Wi-Fi access device;

sending the location information to the access device using a secure authenticated Wi-Fi connection;

determining that an access device is within a proximity to one or more exclusion zones based upon a baseline location, wherein the baseline location is based on the location information and one or more Wi-Fi location determination features, and wherein the one or more exclusion zones correspond to one or more areas in which unlicensed band usage impacts one or more microwave paths; and determining one or more frequencies to avoid based on the proximity of the access device to the one or more exclusion zones;

identifying one or more operating requirements of the access device based on the proximity of the access device to the one or more exclusion zones; and outputting the one or more operating requirements to the access device.

16. The one or more non-transitory computer readable media of claim 15, wherein the one or more computer-readable instructions when executed by the processor further cause the portal system to further perform the one or more operations comprising:

determining that the access device has moved by comparing a current location of the access device to the baseline location; and initiating an action for ensuring compliance with one or more regulatory requirements based on the determining that the access device has moved.

17. The one or more non-transitory computer readable media of claim 16, wherein the initiating the action comprises any of halting an automated frequency coordination (AFC) regulated operation, reducing a transmit power, changing a channel to a channel that does not require ACS-regulated operation, power down, or any combination thereof.

18. The one or more non-transitory computer readable media of claim 16, wherein the comparing the current location to the baseline location comprises determining that a difference between the current location and the baseline location exceeds a threshold.

19. The one or more non-transitory computer readable media of claim 15, wherein at least one of:

determining that the access device is within the proximity to the one or more exclusion zones is based on an uncertainty associated with the baseline location; and the one or more operating requirements comprises a maximum transmit power level, an allowed frequency block, or both.

20. The one or more non-transitory computer readable media of claim 15, wherein the one or more exclusion zones are designated areas in which unlicensed band usage impacts one or more microwave paths.

* * * * *